Oct. 19, 1926.
O. STROMBORG
1,603,816
PORTABLE POULTRY FENCE
Filed Nov. 24, 1924
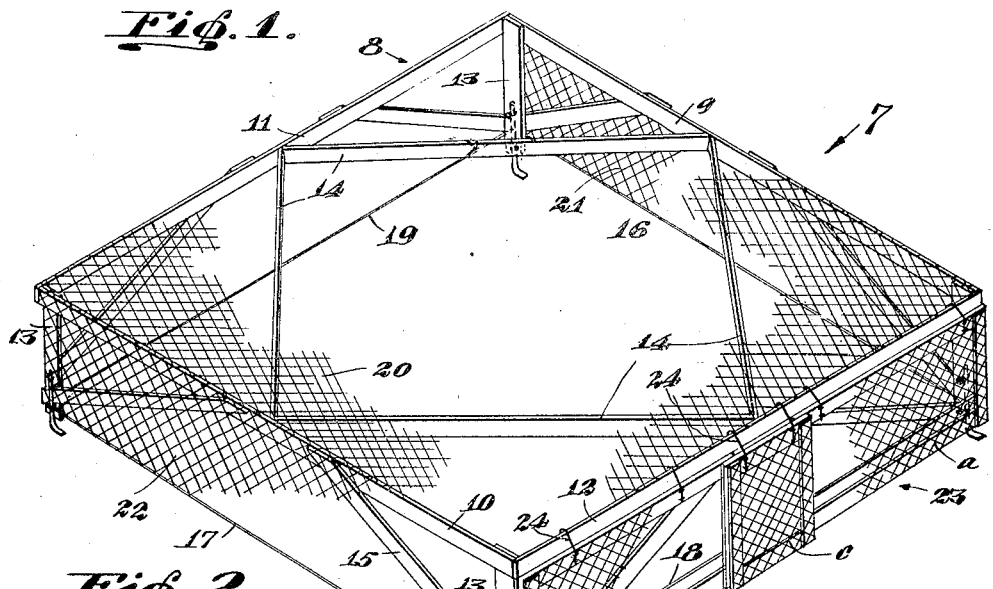
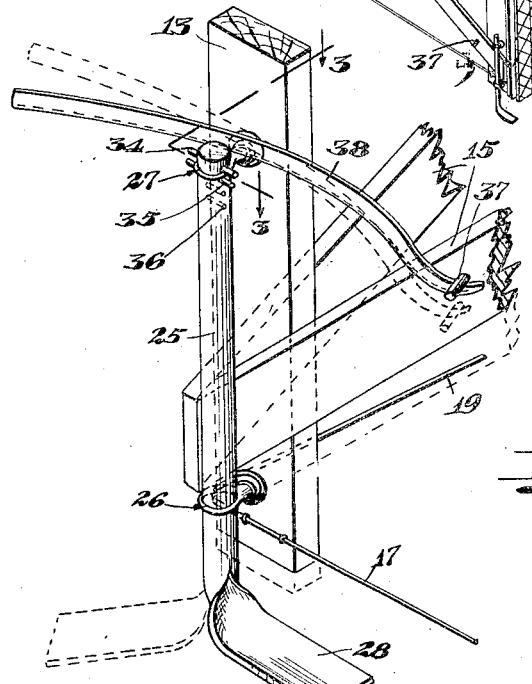
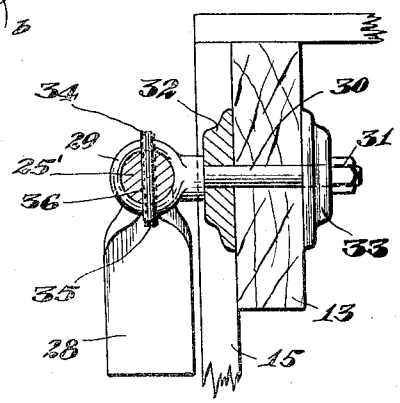
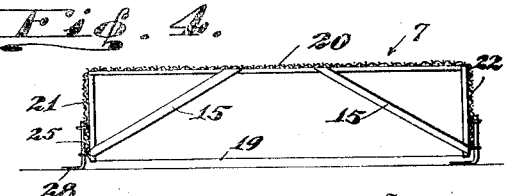
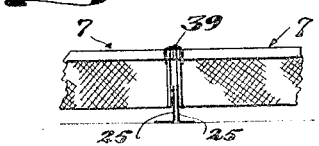
Inventor
Oscar Stromborg,
By R. S. Burns
Attorney Patented Oct. 19, 1926.

1,603,816

UNITED STATES PATENT OFFICE.

OSCAR STROMBORG, OF LOS ANGELES, CALIFORNIA.

PORTABLE POULTRY FENCE.

Application filed November 24, 1924. Serial No. 751,852.

This invention particularly pertains to an enclosure for confining or excluding animals, birds, fowl and the like, and which is especially applicable for use as a pen or run for poultry.

An object of the invention is to provide an enclosure which is portable and which may be readily moved from place to place over the surface of the ground whereby a change of yard or pasture may be easily effected.

Another object is to provide a sectional portable enclosure whereby an enclosure unit may be erected of any desired length by varying the number of enclosure sections and in which the adjacent sections may be readily connected together and quickly taken apart.

A further object is to provide an enclosure of the above character which is fitted with supports adapted to bear in the ground surface and serve as skids to facilitate shifting of the enclosure and which will obviate the use of wheels or tracks, and in which the support is so constructed as to permit of vertical adjustment of the enclosure walls relative to the ground surface.

The mode of carrying out the foregoing objects, as well as such objects, features and advantages of the invention as may subsequently appear, is hereinafter described, and is illustrated by way of example in the accompanying drawings in which the several views depict constructions and arrangements of elements and parts whereby the invention may be carried into effect.

Referring to the drawings the several views are as follows:—

Figure 1 is a perspective view of an enclosure section constructed in accordance with the invention;

Figure 2 is a detail in perspective of the enclosure supporting means;

Figure 3 is a view in horizontal section as seen on the line 3—3 of Figure 2;

Figure 4 is a view of the enclosure structure as seen in end elevation;

Figure 5 is a fragmentary view in side elevation illustrating the manner of connecting adjacent enclosure sections to form an enclosure unit.

Referring to the drawings more specifically, 7 indicates generally the enclosure structure which embodies a rectangular frame 8 comprising side members 9 and 10 and end members 11 and 12 which frame is carried at its corners on posts 13, the frame members being suitably braced by diagonal braces 14 extending between the side and end members of the frame and the corner posts 13 being maintained in position by struts 15 leading diagonally from the lower end portions of the posts to the contiguous side and end members of the rectangular frame. The lower ends of the posts 13 connect with a rectangular wire frame embodying side members 16 and 17 and end members 18 and 19 extending parallel with the side and end members of the top frame 8 whereby the lower end of the posts 13 are securely tied together.

The frame 8 is covered with wire netting forming a top panel 20, and the space bounded by the side members 9 and 10 and 16 and 17 of the upper and lower frames respectively, is covered with wire netting forming side panels 21 and 22.

The netting forming the top and side panels comprises the ordinary poultry wire of commerce, which is securely fastened to the frame work of the structure in any desired manner.

The ends of the structure thus formed are normally open so that a series of the structures may be placed end to end to form a continuous runway from a plurality of the sections and whereby a runway of any desired number of sections may be formed.

The open ends of the sections may be closed by removable end panels indicated generally at 23 in Figure 1; a series of which may be utilized in closing the open end of the structure, three of such panels being here shown as employed for this purpose with a pair of the removable panels, indicated at $a$ and $b$, extending toward each other from the corner posts 13 and spaced apart at their adjacent ends to form a gateway which is closed by a third panel c.

The panels a, b and c are demountably held in place by hooks 24 secured to the upper edge portion of the panels and hooked over the end member of the frame.

The removable end panel c forming a gate is arranged to overlap the adjacent panels a and b and by reason of being suspended by the hooks 24 is adapted to be swung upwardly to afford ingress to or egress from the enclosure.

The panels 23 may be of any suitable construction being here shown as comprising rectangular frames covered with wire netting.

Mounted on each corner post 13 is a supporting member indicated generally at 25 which comprises a stem 25' projecting vertically along the outside of the post and mounted to rotate in a pair of vertically spaced bearings 26 and 27 and held against longitudinal movement therein; the lower end of the stem 25 being bent at substantially right angles and flattened to form a wide shoe 28 adapted to rest on the ground; the several shoes 28 forming swiveled skids on which the structure is supported and on which the structure may be skidded in shifting it from place to place.

The bearings 26 and 27 each comprise an annular head 29 formed on a bolt shank 30 threaded to receive a nut 31. The bearing is mounted on the post by passing the shank 30 through the post and clamping it thereon by means of the nut 31; a washer 32 being interposed between the head 29 and the outer face of the post and a washer 33 being interposed between the nut 31 and the inner face of the post.

As a means for holding the stem 25 against longitudinal movement in the bearings a pair of removable pins 34 and 35 are inserted in superposed spaced openings 36 in the stem with their end portions projecting on opposite sides of the stem and also extending contiguous the upper and lower edges of the upper bearing 27; which bearing seats on the lowermost pin 34 whereby the corner portion of the structure is supported on the stem 25'. As a means for permitting vertical adjustment of the stem on the post 13 whereby the enclosure structure may be raised or lowered relative to the ground, a series of the spaced openings 36 are provided in the stem to receive the pins 34 and 35 whereby the latter may be disposed at various points on the stem as occasion may require.

In order to facilitate the removal and replacement of the pins 34 and 35 a stud 37 is mounted on one of the struts 15 near a corner post 13 and located in such position relative to the stem 25 that a lever 38 may be positioned on the upper part of the bead 29 of bolt 30 with its end projecting beneath the stud whereby the lever may be operated to lift a corner of the enclosure structure relative to the stem 25 by bearing down on the outer end of the lever thus carrying the load of the corner of the structure on the lever and permitting the easy withdrawal of the pins from and their replacement in the openings in the stem.

In the application and operation of the invention, where it is desired to erect a yard or run of greater area than that afforded by a single enclosure section, two or more of the sections are placed end to end with their open ends abutting and connecting together as shown in Figure 5; the adjacent sections being tied together by means of U-clips 39 placed astride the adjacent end members of the frame 8. The swivelled skids at the corners of an enclosure section serve to permit ready shifting of the sections in positioning them adjacent each other in assembling a unit of two or more sections, and also in separating the sections. The open ends of the unit may be closed in any desired manner, but the end panels 23 are provided for this purpose.

By constructing the enclosure section as herein set forth, the section may be constructed of such large size as would ordinarily preclude easy handling.

While the manner of carrying the invention into effect has been specifically set forth herein, it is to be understood that various changes and modifications in the construction and arrangement shown and described may be made without departing from the spirit of the invention.

I claim:—

1. In a portable enclosure, the combination of an enclosure frame including corner posts, supports for said frame comprising vertical stems, bolt connections between the posts and stems, skids on the lower ends of said stems, struts connecting the frame and corner posts, studs disposed on the struts, and a lever adapted to fulcrum on one of the bolts and adapted for engagement with a stud for elevating one end of the enclosure frame.

2. A portable enclosure comprising a frame having corner posts, struts connecting the frame and posts, stems arranged at the ends of the frame, skids integral with the stems adapted for supporting the frame, bolts secured to the corner posts and having annular beads through which the stems extend, pins arranged on the stems and adapted for engagement with the bolt heads for supporting the frame on the stems, studs on the struts, and levers fulcrumed on the bolts and engaging the studs for elevating the frame on the stems.

3. A portable enclosure comprising a frame having corner posts, struts connecting the frame and posts, stems arranged at the ends of the frame, skids integral with the stems adapted for supporting the frame, bolts secured to the corner posts and having annular beads through which the stems extend, pins arranged on the stems and adapted for engagement with the bolt heads for supporting the frame on the stems, studs on the struts, levers fulcrumed on the bolts and engaging the studs for elevating the frame on the stems, and pins detachably connected to the stems for supporting the frame in elevated position.

OSCAR STROMBORG.